Patented Oct. 31, 1950

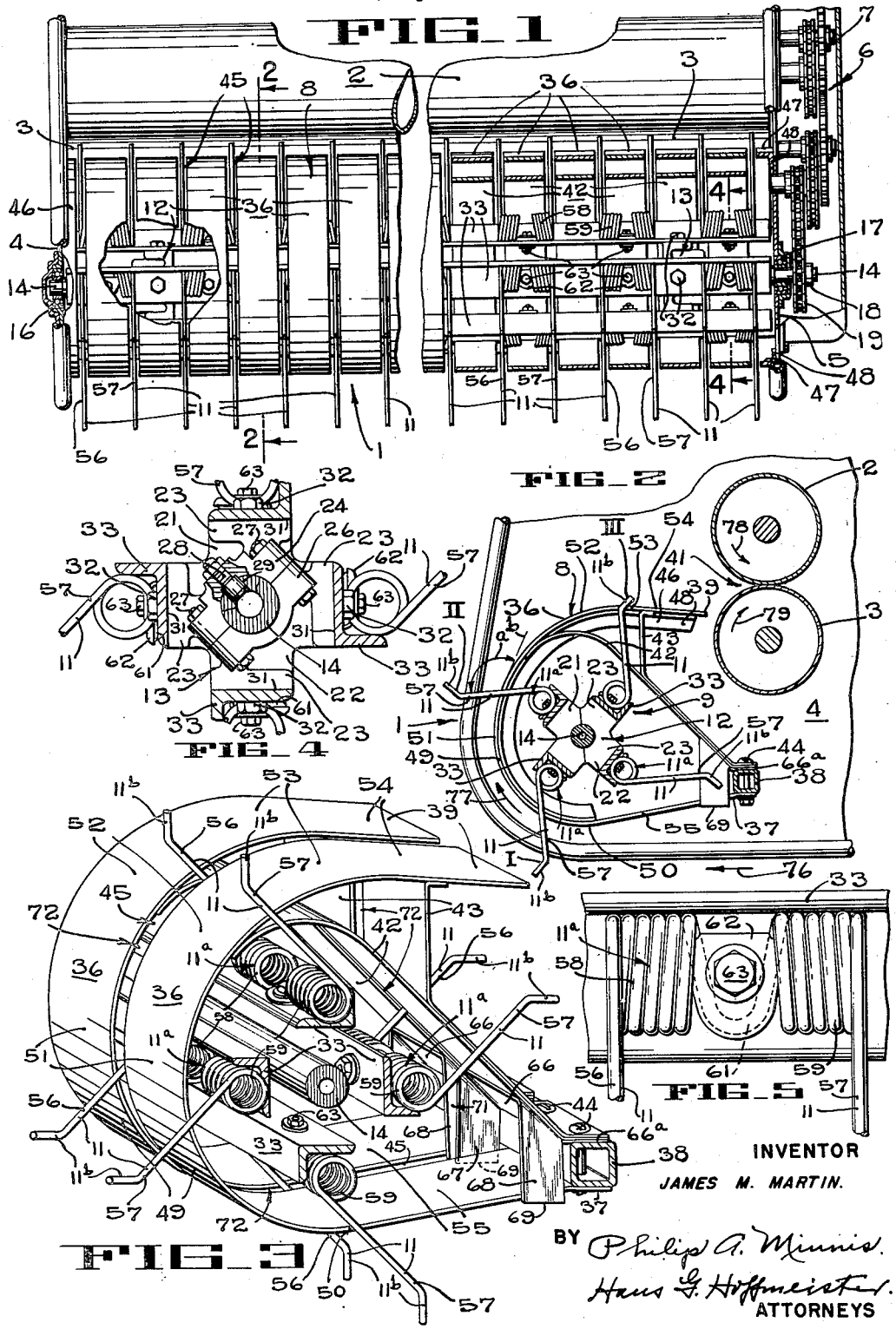

2,527,887

UNITED STATES PATENT OFFICE 2,527,887

PICKUP MECHANISM FOR HARVESTING MACHINES

James M. Martin, Lansing, Mich., assignor to Food Machinery and Chemical Corporation, a corporation of Delaware Application April 18, 1947, Serial No. 742,369

5 Claims. (Cl. 56—364)

The present invention relates to a pick-up mechanism for machines for harvesting alfalfa, hay, or the like.

One object of the present invention is to provide a pick-up mechanism for harvesting machines wherein a relative retraction between the fingers and scroll structure is obtained incident to rotation of the fingers about a fixed axis.

Another object is to provide a pick-up mechanism wherein non-retractable pick-up fingers are rotated about a common axis and the scroll structure is so designed as to cause the fingers to have the effect of retraction relative thereto.

Another object is to provide a pick-up mechanism for harvesting machines wherein the pick-up fingers are so disposed relative to the scroll structure as to reduce wrapping of the alfalfa or hay around the fingers to a minimum and to permit easy removal of the hay from and between the fingers irrespective of the volume of material handled by the machine.

Another object is to provide a pick-up mechanism wherein the pick-up fingers are so constructed as to produce a highly efficient pick-up action while, at the same time, facilitating the removal of the picked up hay or alfalfa therefrom.

Another object is to provide a pick-up mechanism for harvesting machines wherein the number of moving parts has been reduced to a minimum.

Another object is to provide a pick-up mechanism of simple but rugged construction and highly efficient operation.

Other and further objects and advantages of the present invention will become apparent from the following description and drawings in which:

Fig. 1 is a front elevation of the pick-up mechanism and a portion of an alfalfa harvesting machine, certain parts being broken away while others are shown in section.

Fig. 2 is a vertical section of Fig. 1 taken along line 2—2 thereof.

Fig. 3 is an enlarged perspective view of a portion of the pick-up mechanism, certain parts being omitted while others are shown in section.

Fig. 4 is an enlarged section of a portion of Fig. 1 taken along line 4—4 thereof.

Fig. 5 is an enlarged plan view of a portion of one of the spring finger units and the angle bar associated therewith.

The pick-up mechanism 1 of the present invention has been shown in connection with a portion of an alfalfa harvesting machine of the type illustrated in Patent No. 2,345,715 to Russel H. Reed, dated April 4, 1944. In this type of machine presser rolls 2 and 3 are rotatably mounted between side plates 4 and 5 of the frame structure of the machine. These presser rolls are driven in opposite directions, as indicated by arrows in Fig. 2, during the operation of the machine by a drive mechanism 6 disposed within a transmission housing 7 secured to the side plate 5 so that alfalfa fed to and introduced between the presser rolls 2 and 3 is gripped thereby, advanced therebetween, and discharged therefrom at the rear end of the machine back onto the field for subsequent drying.

The pick-up mechanism 1 of the present invention (Figs. 1 and 2) which is adapted to pick up the cut alfalfa from the field and to feed the same to the presser rolls is mounted between the side plates 4 and 5 in front of the presser rolls 2 and 3 and comprises in general a feed table or scroll structure 8 and a rotary reel or rake 9 associated therewith and provided with a plurality of tines or pick-up fingers 11.

The reel 9 comprises a plurality of spiders 12, 13 fixed to a shaft 14 disposed between the side plates 4 and 5 in parallel relation to the presser rolls. The shaft 14 is rotatably mounted within ball bearings 16 and 17 carried by the side plates and extends into the transmission housing 7. Fixed to the free end of the shaft 14 in the transmission housing 7 is a sprocket 18 which is driven by the drive mechanism 6 of the machine by means of an endless sprocket chain 19.

The spiders 12 and 13 (Figs. 2 and 4) are preferably formed in two sections 21 and 22 each comprising a plurality of spider arms 23 and a hub portion 24 and 26, respectively. The sections 21 and 22 are firmly secured to each other and the shaft 14 by means of bolts 27 extending through the hub portions 24 and 26 (Fig. 4). A pin or key 28 secured to the hub portion and extending into a hole 29 of the shaft 14 prevents rotation of each spider relative to the shaft 14.

The spiders 12 and 13 (Fig. 1) are fixed to the shaft 14 adjacent opposite ends thereof and depending upon the width of the pick-up mechanism 1 any additional number of spiders of like construction disposed intermediate the spiders 12 and 13 may be employed to give the reel structure the required rigidity. The arms 23 of the spiders 12 and 13 are aligned with each other transversely of the machine and are each provided with a flat surface 31. Secured to the flat surface 31 of transversely aligned arms 23 of the spiders 12 and 13 by means of cap screws 32 is an angle or finger supporting bar 33, the free ends of which extend into proximity of the side plates 4 and 5, respectively. All of the transverse bars 33 are disposed in parallel relation to each other and the shaft 14 and form in conjunction with the spiders 12, 13 and shaft 14 a rigid reel structure 9 rotatably supported by the bearings 16 and 17 between the side plates 4 and 5 of the machine and within the feed table structure or scroll 8.

The scroll 8 comprises a plurality of material supporting plates or guide strips 36 (Figs. 1, 2, and 3), each in the from of a substantially parabolic curve, the lower ends 37 of which are secured to a supporting bar 38 fixed to the end plates 4 and 5 and extending therebetween tansversely of the frame structure of the machine. The upper free ends 39 (Fig. 2) of the strips 36 extend into proximity of the lower presser roll 3 somewhat below the mouth 41 formed between the presser rolls at the receiving or feed side thereof. The upper portion of each strip 36 adjacent the free end 39 thereof is firmly supported by strip-like braces 42 and 43 preferably welded thereto and to each other and firmly secured at their lower ends to the transverse supporting bar 38 by bolts 44 which also secure the lower end 37 of the strips 36 thereto. The braces 42 and 43 are of the same width as the strips 36, as will be apparent from Fig. 3.

Each material supporting or guide strip 36 (Fig. 2) of the scroll structure 8 extends from the bar 38 forward and downward and curves upward and backward around the reel 9 in spaced relation thereto and terminates in proximity of the lower presser roll 3, as above described. Adjacent strips 36, braces 42 and 43 are spaced laterally from each other so as to provide open spaces 45 therebetween. The two end guide strips 46 and 47 (Fig. 1) of the scroll structure 8 differentiate from the remaining guide strips 36 in that they are provided with a flange 48, instead of the braces 42 and 43, by which they are firmly secured to the side plates 4 and 5, respectively, by welding or otherwise securing the flange 48 thereto (Figs. 1 and 2).

The lower front portion 49 (Fig. 2) of each guide strip 36 of the scroll 8 from approximately zone 50 to approximately zone 51 forms the arc of a circle having its center coincident with the longitudinal axis of the shaft 14 of the reel 9 while the upper front portion 52 (Fig. 2) of each guide strip 36 from approximately zone 51 to approximately zone 53 forms a curve of increasing radius with respect to the axis of the shaft 14. In other words, the scroll is provided with an upper curved portion gradually receding from the reel in the direction of rotation thereof. The top portion 54 of each guide strip 36 from about zone 53 to the free end 39 thereof is straight, tangentially disposed to the curved portion 52 and declines toward the presser roll 3. The lowermost portion 55 of each guide strip 36 is also straight and declines toward the zone 50 tangentially to the curved portion 49.

Secured to each angle bar 33 of the reel 9 are a plurality of pick-up fingers 11, previously referred to. These fingers (Figs. 1, 3, and 5) are made in units 11a formed from a single piece of heavy spring steel wire. Each finger unit 11a comprises two straight finger portions 56 and 57 terminating at their lower ends in a coiled portion 58 or 59, respectively. The coiled portions of each unit are joined by an intremediate portion 61 of loop-like configuration which is firmly clamped to the angle bar 33 by means of a clamping plate 62 and a bolt 63 in such a manner that the coil portions 58 and 59 are in contact with the legs of the angle bar 33 and lateral turning of the finger units 11a about the bolt 63 is prevented. The free end 11b of each finger is bent at an angle of 135° with respect to the leading side of the straight finger portion 56 or 57, respectively, for purposes later explained herein. The straight finger portions 56 and 57 are so disposed relative to the intermediate portion 61 and coil portions 58 and 59, respectively, that when each finger unit is attached to the angle bar 33 the straight finger portions thereof are normally disposed at an angle of 45° in counterclockwise direction with respect to the radial axis of the spider arm 23 associated therewith as well as the surface 31 thereof. In the preferred embodiment, the fingers of adjacent angle bars 33 are disposed at right angles with respect to each other it being noted, however, that in principle they extend from the reel in a plane which is substantially congruent to the point of fixation of a preceding finger to the reel. The finger units 11a are furthermore attached to the angle bars 33 in such positions longitudinally thereof that the straight finger portions 56 and 57 project from the scroll structure 8 through the open spaces 45 between adjacent strips 36 (Figs. 2 and 3) and freely travel along the same without interference with the strips 36 or braces 42, 43 thereof.

Disposed adjacent the bottom surface of each brace 42 in front of the transverse supporting bar 38 (Figs. 2 and 3) is a U-shaped deflector unit 66 having downwardly projecting legs 67 and 68 which extend through the spaces 45 adjacent each side of the guide strip 36 with which they are associated and terminate with a straight edge 69 slightly below the portion 55 thereof. Each deflector unit 66 is provided with a flange 66a secured to the transverse bar 38 by the bolts 44, previously referred to, so that each unit is firmly held in position. The adjacent legs 67 and 68 of adjacent deflector units 66 converge in downward direction so as to form a downwardly converging passage 71 with the lower edges 69 of the legs 67 and 68 sufficiently close to each other to exert a scraping action upon the free ends of the fingers 11 during their passage therebetween. The legs 67 and 68 form in conjunction with the adjacent guide strips 36 and braces 42 and 43 a continuous guide channel 72 within which the fingers travel and by which they are properly guided during the rotation of the reel 9.

During the operation of the machine, i. e., while the same is propelled over the field in the direction of arrow 76 (Fig. 2) the reel 9 and fingers 11 are rotated in the direction of arrow 77 and the presser rolls are rotated in opposite directions, as indicated by arrows 78 and 79. The machine is so supported that the fingers 11 pass over the ground in proximity thereto, engage the cut alfalfa, lift the same from the field upon the scroll 8, advance the plants therealong toward the presser rolls 2 and 3, and introduce the alfalfa into the mouth 41 of the rolls 2 and 3. The rolls grip the alfalfa presented thereto and advance the same therebetween whereby the stems of the alfalfa are cracked and the treated alfalfa is subsequently discharged back onto the field at the rear end of the machine.

While the alfalfa is fed in this manner from the field to the presser rolls 2 and 3 and advances over the scroll structure 8, a relative retraction of the fingers with respect to the scroll 8 is obtained in view of the curvature of the scroll portion 52 which, as has been previously stated herein, curves upwardly with an increasing radius relative to the axis of rotation of the reel. Consequently, as the fingers move from their position shown at I in Fig. 2 to their position II and finally to their position III, they gradually move out of the path of the alfalfa advancing toward the presser rolls 2 and 3. During the travel of the fingers from position I to position III past the portions 49 and 52 of the scroll, the leading side of the finger portions 56 and 57 is always disposed at an obtuse angle $a$ (Fig. 2) with respect to a line $b$ tangent to the scroll surface at the point of convergence of the finger therewith so that forcing of plant material into the scroll structure during the rotation of the fingers is prevented. Due to the angular disposition of the finger portions 11b with respect to the leading side of the finger portions 56 or 57, the leading side of the finger portions 11b is disposed at an angle of approximately 45° with respect to the top surfaces 54 of the scroll when the fingers arrive at their position as shown at III (Fig. 2) so that the alfalfa engaged by the presser rolls 2 and 3 and drawn into the same during the continuous operation of the rolls can be readily pulled away from the finger portions 11b. The presser rolls 2 and 3 are operated at a greater speed than the reel 9 so that they are always hungry for alfalfa and quickly pull the same away from the fingers as they reach their position as shown at III in Fig. 2. Consequently, the finger portions 11b are cleared of all plant material before they retract into the scroll structure 8 during the continuance of their rotation in the direction of arrow 77 and, therefore, the pulling down of plant material into the scroll structure by the finger portions 11b is substantially eliminated.

During their downward travel, the fingers are guided by the braces 42, 43, and legs 67 and 68 of the deflectors 66 so that they properly enter the spaces 45 between the lower scroll strips 55 and as the fingers travel through the converging passage 71 and emerge therefrom any plant material adhering to the same is scraped off the finger portions 11b by the scraping action of the lower edges 69 of the legs 67 and 68 thereagainst. However, the primary function of the plates 67 and 68 is to properly guide the fingers from between adjacent braces 42 and 43 into the space 45 between the lower portions 55 of the strips 36 so that at all times the fingers are held against lateral deviations from their course whereby damage to the fingers and the scroll structure and its associated parts is prevented.

In their lowermost pick-up position, as shown at I in Fig. 2, the fingers 11 protrude a maximum distance from the scroll 8 so that they effectively gather and elevate batches of alfalfa with an upwardly sweeping or scooping action and deliver the same onto the scroll. The bent portions 11b retain the alfalfa on the fingers, i. e., prevent the alfalfa from sliding off the fingers back onto the field. During the travel of the fingers from about the position II to the position III (Fig. 2) and their relative retraction with respect to the scroll 8, the alfalfa is more and more supported by the scroll 8 and since the relative retraction of the fingers progresses gradually, with the finger portions 56 and 57 always disposed at an obtuse leading angle to the scroll surface, as above explained, wrapping of plants around the fingers is prevented so that the fingers stay clean and do not carry plant material into the interior of the scroll structure 8. The fingers 11 are, however, freely yieldable in their plane of rotation in view of the coiled portions 58 and 59 associated therewith so that during the rotation of the reel they may swing backward or forward to evade obstructions.

From the above it will, therefore, be seen that an effective feeding of the alfalfa or hay from the field to the presser rolls is obtained without the necessity of providing complicated mechanism for shifting the fingers on the reel to effect their retraction with respect to the scroll structure. Due to the simplicity of the construction, all moving parts and bearings, with the exception of the two bearings 16 and 17 which may be arranged in dust proof housings, are eliminated so that dust, grit, and plant material to which the pick-up mechanism is subjected in actual operation do not enter any moving parts of the machine. Consequently, excessive wear, to which pick-up mechanisms with physically retractable fingers are subjected, is prevented and frequent replacement of worn parts is eliminated.

While I have described a particular embodiment of the present invention, it will be understood that various changes and modifications may be made without departing from the spirit of the present invention and the scope of the appended claims.

Having thus described my invention, what I claim as new and desire to protect by Letters Patent is:

1. A pick-up mechanism for harvesting machines of the class wherein spaced presser rolls receive and advance hay therebetween comprising a frame, a reel rotatably mounted on said frame, guide plates fixed to said frame and extending above said reel in spaced relation thereto, said guide plates being formed in a substantially parabolic curve having a front portion curved upwardly around said reel and an upper curved portion gradually receding from the reel and terminating in a hay supporting surface adjacent said presser rolls for feeding material into the same, a plurality of pick-up fingers fixed to said reel and adapted to travel between said plates and to project therefrom with the leading side of said fingers disposed at an obtuse angle relative to a line tangent to said plates at the point of projection of said fingers therebetween, each of said fingers being mounted on said reel at a point spaced from the reel axis and extending outwardly between said guide plates at an angle to the radius of the reel extending through said point, whereby rotation of said reel effects travel of said fingers along said plates and relative retraction of said fingers at said obtuse angular position with respect thereto during the advancement of the fingers along the front portion of said plates to thereby facilitate removal of the material from between said fingers and said receiving portion of said plates by the action of said presser rolls.

2. A pick-up mechanism for harvesting machines comprising a frame, a reel rotatably mounted on said frame, material supporting elements fixed to said frame and extending in laterally spaced relation about said reel, each of said material supporting elements having a curved upper front portion gradually receding from the reel and terminating in an upper rearwardly extending portion and a lower front portion forming an arc of a circle about the axis of rotation of the reel and terminating in a lower rearwardly extending portion, a plurality of pick-up fingers fixed to said reel and adapted to travel between said elements and extending therefrom, means for rotating said reel to effect travel of said fingers along said elements and retraction of the fingers with respect thereto during advancement of the fingers along the receding portions of said elements, and means interposed between said upper receding portions and said lower rearwardly extending portions for guiding said fingers during their travel therebetween, said means including cooperating downwardly converging deflector plates each provided with a lower sharp edge for exerting a scraping action against the free ends of said fingers.

3. In a harvesting machine of the class wherein hay is advanced over a substantially parabolically curved and slotted feed table into and between spaced rapidly rotating presser rolls, the combination therewith of a rotary reel mounted within and adjacent the leading end of said parabolically curved feed table, a plurality of tines respectively fixed to said reel at a point spaced from the axis thereof, each of said tines extending outwardly through said table at an angle to a radius of the reel extending through said point, thereby disposing the leading face of each tine at an oblique angle with respect to a line tangent to that portion of said table where said tine extends therethrough, to thereby present hay to said presser rolls for free discharge thereby during relative retraction of said tines with respect to the upper surface of said parabolically curved table.

4. In a harvesting machine of the class wherein hay is advanced over a substantially parabolically curved and slotted feed table into and between spaced rapidly rotating presser rolls, the combination therewith of a rotary reel mounted within and adjacent the leading end of said parabolically curved feed table, a plurality of tines fixed to said reel each at a predetermined radial distance from the axis of said reel and from each other, said tines being respectively mounted on the reel at a point spaced from the reel axis and each of said tines extending outwardly through said table at an angle to a radius of the reel extending through said point, thereby disposing the leading face of each tine at an oblique angle to a line tangent to that portion of said table through which said tine extends and for maintaining said tines in such relation to said table during relative retraction of said tines with respect to the upper surface of said parabolically curved table to thereby present hay to said presser rolls for free discharge thereby, each tine having its tip portion bent at an angle forwardly in its direction of rotation for scooping up hay for advancement round the leading end of said feed table and for facilitating endwise removal of hay from said tines by the action of said rapidly rotating presser rolls.

5. In a pick-up mechanism for hay harvesters of the type including presser rolls adapted to receive hay fed thereto, the combination with a feed table comprising a plurality of spaced plates each formed in a substantially parabolic curve having a lower front wall and an upper hay supporting surface terminating adjacent said rolls, of a reel mounted within said feed table for rotation about an axis nearer to the lower front wall than to the upper supporting surface of said plates, means for rotating said reel in a direction from the front wall to the upper surface of said plates, and a plurality of tines fixed to said reel at a predetermined distance from each other, each of said tines being mounted on the reel at a point spaced from the reel axis and extending outwardly through said table at an angle to a radius of the reel extending through said point, whereby said tines are disposed with their front face at an obtuse angle to a line tangent to any portion of said plates between which they extend, said tines having their tips bent at an angle of 45° in the direction in which they travel for facilitating lifting of hay around the lower front wall of said plates and for effecting endwise removal of hay from said tines by the action of said rolls.

JAMES M. MARTIN.

REFERENCES CITED

The following references are of record in the file of this patent:

UNITED STATES PATENTS

| Number | Name | Date |
| --- | --- | --- |
| 1,877,519 | MacGregor | Sept. 13, 1932 |
| 2,256,829 | Hyman | Sept. 23, 1941 |
| 2,345,715 | Reed | Apr. 4, 1944 |
| 2,364,303 | Martin | Dec. 5, 1944 |
| 2,378,107 | Russell | June 12, 1945 |